No. 871,381. PATENTED NOV. 19, 1907.
G. WENZELMANN.
SHEET METAL CONVEYER.
APPLICATION FILED AUG. 17, 1906.
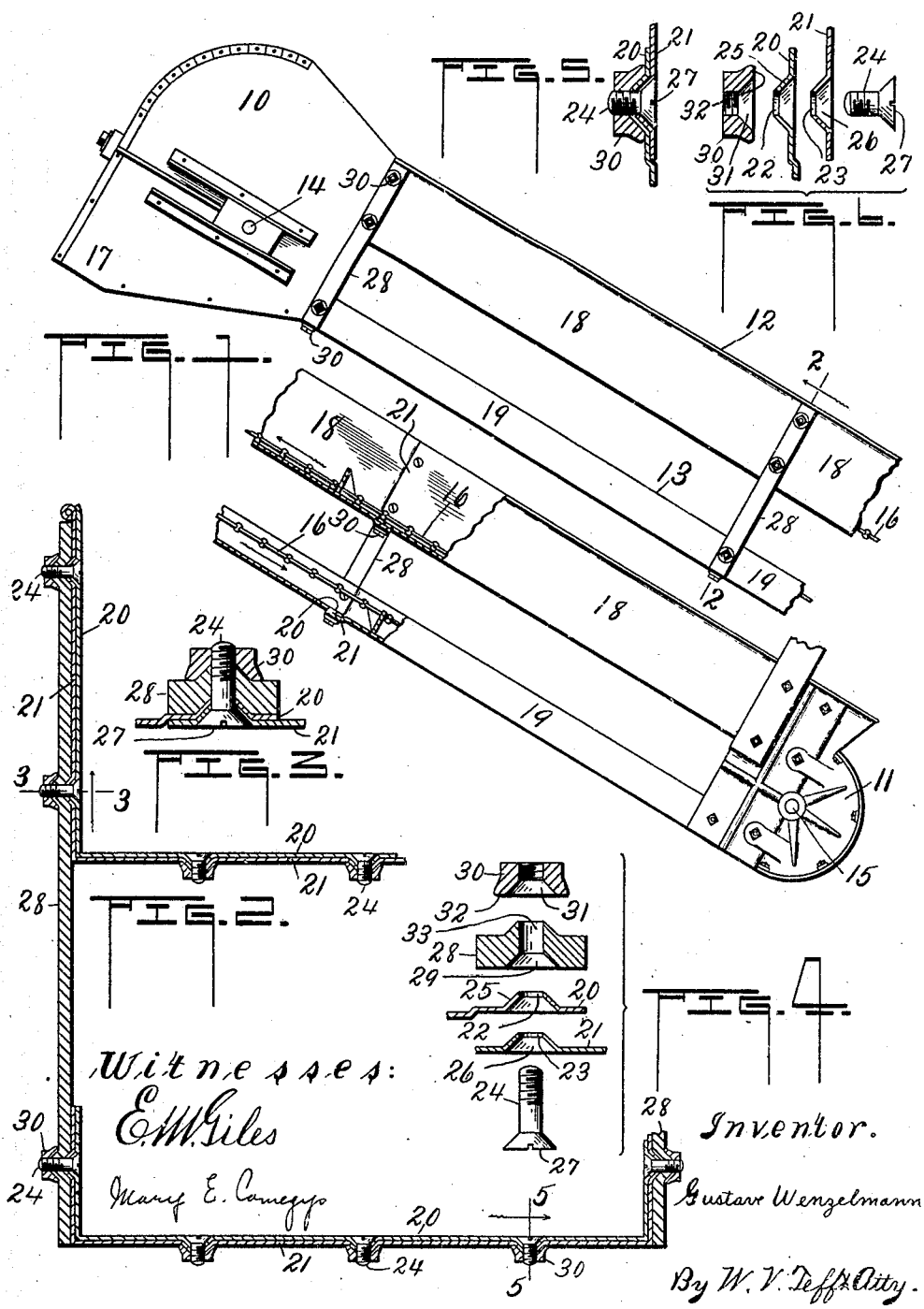

UNITED STATES PATENT OFFICE.

GUSTAVE WENZELMANN, OF GALESBURG, ILLINOIS.

SHEET-METAL CONVEYER.

No. 871,381.  Specification of Letters Patent.  Patented Nov. 19, 1907.

Application filed August 17, 1906. Serial No. 330,961.

To all whom it may concern:

Be it known that I, GUSTAVE WENZELMANN, a citizen of the United States, residing at Galesburg, in the county of Knox and State of Illinois, have invented certain new and useful Improvements in Sheet-Metal Conveyers; and I do hereby declare that the following is a full, clear, and exact description of the invention, which will enable others skilled in the art to which it appertains to make and use the same.

This invention relates to new and improved means for uniting sheet metal parts, and the object which I have in view is to unite sheet metal parts in a detachable manner so that a smooth surface is presented at the joint.

In the various arts in which sheet metal is employed it is often desirable to unite sheet metal parts or sections so that a smooth surface is presented at the joint, void of all irregularities or obstructions upon which parts moving in close proximity thereto might catch. This is particularly desirable in conveyers and such like machines constructed of sheet metal, in which the conveying mechanism or other moving parts operate in close proximity to the surface of the sheet metal thereof,—and because of its evident utility in such connection, I have shown and described my invention as applied to a conveyer, although it is not confined to such use.

In the accompanying drawings, Figure 1 shows a side view of the upper and lower ends of the elevating conveyer or elevator, portions being broken away for the purpose of illustration; Fig. 2 a cross sectional view on an enlarged scale on the line 2—2, of Fig. 1, looking in the direction indicated by the arrow; Fig. 3 an enlarged view on the line 3—3 of Fig. 2 looking as indicated by the arrow; Fig. 4 a view of the parts of Fig. 3 preparatory to joining together; Fig. 5 an enlarged view on the line 5—5 of Fig. 2 looking as indicated by the arrow, and Fig. 6 shows the parts of Fig. 5 preparatory to joining the same together.

Similar figures of reference refer to similar parts in the several views.

10 and 11 are the head and boot respectively of the elevator which are connected by the conveyer pan 12 and return bottom 13, the said head and boot being provided with the shafts 14 and 15 respectively, around which passes the conveyer mechanism 16. The shafts 14 and 15 are suitably mounted in the head and boot and driven so that the conveyer mechanism 16 which extends from side to side of the conveyer pan 12 travels therein from the boot to the head of the elevator in close proximity to the bottom of the conveyer pan, and material deposited in the lower end or boot of the elevator is dragged or carried upward through the conveyer pan 12 by the conveyer mechanism to the elevator head 10 and discharged therefrom through the spout 17. The return bottom 13 is arranged beneath the conveyer pan 12 and parallel thereto and within this said return bottom the conveyer mechanism 16 returns from the head of the elevator to the boot. This elevator is made almost wholly of sheet metal and is built in sections so that the length can be increased and decreased as desired.

The sections 18 of the conveyer pan and 19 of the return bottom are of corresponding lengths and where joined together and to the head and boot of the elevator there are provided the overlapping portions 20 and 21, the portion 20 being preferably overlapped in the direction in which the flights travel, and the portion 21 swaged outwardly as shown so as to present no irregularity in the surface where the parts unite. In the overlapped portions 20 and 21 are matching perforations 22 and 23 respectively, through which pass the bolts 24 which fasten the parts together. The bolts which I employ are preferably taper head bolts and are passed through the perforations of the sheet metal parts from the inner side of the conveyer pan and return bottom, (the side that is designed to be void of obstructions and irregularities) and the metal of the overlapped portions 20 and 21 around the perforations is countersunk or extended in the direction in which the bolt is passed therethrough, the portion 21 as at 26 to receive and contain the head of the bolt with its end face 26 flush with the inner surface of the overlapped portion 20 and the portion 20 as at 25 so as to receive and contain the boss of the portion 11 formed by the countersinking thereof and permit the overlapping portions to be drawn into close contact.

In joining the sheet metal sections of the conveyer pan and return bottom together at the sides of the elevator, I use the stays 28 which are perforated as at 23 to match the perforations of the joints at the sides of the elevator, and the metal of the stays around said perforations is pressed outwardly as at 29 to provide a recess to receive the bosses of the outer overlapped portion 20 formed by the countersinking thereof as hereinbefore mentioned. The recesses in the stays 28 are preferably formed by pressing out the metal while hot to form the desired recess on the inner face thereof, which operation forms a corresponding boss on the outer face of the strip. By forming the recesses in the above manner, instead of countersinking by means of a drill, the original strength of the strip is retained.

The nut 30 which I employ for joining the sections of the elevator is countersunk on its inner face as at 31 and in joining the sides of the conveyer pan and return bottom of the elevator, when turned on the bolt 24, the rim 32 of the nut bears against the strap 28, draws the head of the bolt into the countersink 26 of the portion 21, the boss of the part 21 into the countersink 25 of the part 20, the boss of the part 20 into the countersink 29 of the stay and the boss on the stay into the countersink of the nut 30, making a firm joint with a smooth inner presented face void of all obstructions and irregularities. The use of the stays 28 at the sides of the elevator not only forms a convenient method of seating the bosses of the joints but also braces the conveyer pan and return bottom throughout the length of the elevator.

Where the bottom parts of the conveyer pan and return bottom sections are joined together, it is preferable not to use stays as at the sides thereof, consequently the rim of the nut 30 bears directly on the outer surface of the overlapped portion 20 as shown in Fig. 5, and the boss of the said outer section is drawn into the countersink 31 of the nut, the head of the bolt into the countersink 26 of the inner section, and the intermediate parts into close contact. The nut 30 is not necessarily confined to the form shown in the drawing but may be of any desired form provided it has a concave or countersunk inner face adapted to receive the bosses of the joint as hereinbefore described.

What I claim is:

1. In a conveyer, the combination of a plurality of sheet metal conveyer sections having the ends of adjacent sections overlapped, means for uniting the side walls of the adjacent sections comprising straps overlying the overlapped portions of the side walls of the adjacent sections, matching perforations in the straps and overlapped portions of the side walls outwardly extended countersunk bosses in the overlapped portions of the side walls around the said perforations, said straps being recessed in the inner faces thereof to receive the said countersunk bosses, bolts passed through the said matching perforations and having the heads thereof seated in the countersinks of the inner overlapped portions of the side walls, and nuts on said bolts at the outside of the said straps, and means for uniting the bottom portions of the adjacent sections comprising matching perforations in the overlapped portions thereof, outwardly extended countersunk bosses in said overlapped portions around said perforations, bolts passing through said perforations and having the heads thereof seated in the countersinks of the inner overlapped portion and nuts on said bolts at the outer side of said overlapped portions.

2. In a conveyer, the combination of a plurality of sheet metal conveyer pan sections having the ends of adjacent sections overlapped, corresponding sheet metal return bottom sections beneath the conveyer pan sections having the ends of adjacent sections overlapped, means for uniting the side walls of the conveyer pan and return bottom sections comprising straps connecting the conveyer pan sections and the return bottom sections, and overlying the overlapped portions of the side walls of the adjacent conveyer pan sections and overlying the overlapped portions of the side walls of the adjacent return bottom sections, matching perforations in the straps and overlapped portions of the side walls of the conveyer pan sections and return bottom sections, outwardly extended countersunk bosses in the overlapped portions of the side walls of the conveyer pan sections and return bottom sections around the said perforations therein, the said straps being recessed in the inner faces thereof to receive the said countersunk bosses therein, bolts passed through the said matching perforations in the overlapped portions of the side walls of the conveyer pan sections and the overlying strap, and bolts passed through the said matching perforations in the overlapped portions of the side walls of the return bottom section and the overlying strap, and nuts on said bolts at the outside of said straps, and means for uniting the overlapped bottom portions of the conveyer pan sections and return bottom sections comprising matching perforations in said overlapped portions, outwardly extended countersunk bosses in said overlapped portions around said perforations, bolts passed through said perforations and having the heads thereof seated in the countersinks of the inner overlapped portion and nuts on said bolts at the outside of the outer overlapped portion.

3. In a conveyer, the combination of sheet metal sections, straps connecting said sections, matching perforations in the sheet metal sections and the straps, correspondingly extended countersunk bosses in the sheet metal sections and the straps, bolts passing through said perforations and having the heads thereof seated in the countersinks of the sheet metal sections and countersunk nuts on said bolts bearing against the strap and overlying the bosses thereof.

4. In a conveyer, the combination of a sheet metal conveyer pan and return bottom, straps connecting the conveyer pan and return bottom, matching perforations in the conveyer pan and straps and in the return bottom and straps, outwardly pressed portions in said strap around the perforations therein, outwardly pressed portions in the sheet metal conveyer pan and return bottom around the perforations thereof extending into the outwardly pressed portions of the strap, bolts passing through the said perforations and having the heads thereof seated in the recesses of the outwardly pressed portions of the conveyer pan and return bottom, and countersunk nuts on said bolts bearing against the straps and containing the bosses of the straps formed by the outwardly pressed portions of the straps in the countersinks thereof.

5. In a conveyer, the combination of a conveyer pan built of sheet metal sections and a return bottom built of corresponding sheet metal sections, each of said sections of conveyer pan and return bottom being provided with portions which overlap portions of the adjacent sections, straps connecting the conveyer pan and return bottom and overlying the overlapped portions of the sections, matching perforations in the overlapped portions of the conveyer sections and the strap and in the overlapped portions of the return bottom and the strap, correspondingly extended countersunk bosses around said perforations in the overlapped portions of the conveyer sections and the strap and in the overlapped portions of the return bottom sections and strap, bolts passing through said perforations and having the heads thereof seated in the countersinks of the inner overlapped portions of the conveyer section and return bottom section and countersunk nuts on said bolts bearing against the straps and containing the bosses on the straps in the countersinks thereof.

In testimony whereof I have affixed my signature, in presence of two witnesses.

GUSTAVE WENZELMANN.

Witnesses:
  NELLIE STARK,
  ROSE LANBURG.